INVENTOR
CARL-ERNST GOTTFRIED NOURNEY

BY A. C. Smith
ATTORNEY

INVENTOR
CARL-ERNST GOTTFRIED NOURNEY

BY G. C. Smith
ATTORNEY 3,268,743
Patented August 23, 1966

3,268,743

PULSE TIME-RELATIONSHIP DETECTOR EMPLOYING A MULTI-STATE SWITCHING CIRCUIT

Carl-Ernst G. Nourney, Palo Alto, Calif., assignor to Hewlett-Packard Company, Palo Alto, Calif., a corporation of California Filed Sept. 16, 1964, Ser. No. 396,845
12 Claims. (Cl. 307—88.5)

This invention relates to signal discriminators, and more particularly to apparatus for determining the relationship in time between a pair of signals occurring on two different input leads during a selected time interval.

In apparatus such as reversible counters where two nearly coincident pulses occur on different input leads, it is useful to know which of the pulses is first in order of occurrence. A signal discriminator for making such a high resolution priority decision is hereinafter referred to as a priority detector.

It is the principal object of this invention to provide a priority detector which accepts pulses from two input leads and produces an output signal indicating which pulse occurred first within a selected time interval.

Another object of this invention is to provide a high resolution priority detector having an inherently digital output.

A signal discriminator which accepts pulses from two input leads and produces an output signal only if the time interval between the two pulses is less than a selected time interval is hereinafter referred to as a coincidence detector. Since coincidence detectors generally produce an analog output signal, a Schmitt trigger is commonly connected to the output of the coincidence detector to serve as a level discriminator.

Accordingly, it is still another object of this invention to provide an improved coincidence detector having an inherently digital output.

In accordance with the illustrated emobdiments of this invention there is provided a circuit for determining the relationship in time of a pair of pulses occurring at two different input leads during a selected time interval. This circuit includes a multivibrator, hereinafter referred to as a priority multivibrator, which has three discrete operating states. The priority multivibrator is connected to receive a bias signal and is responsive thereto for initial operation in one of the discrete operating states during which regeneration is suppressed. In addition the priority multivibrator is connected to the input leads by means responsive to the pulses appearing thereon for overcoming the bias signal, thereby restoring the regeneration of the priority multivibrator and setting it for operation in the one of the two remaining discrete operating states which indicates the relationship in time between the pair of pulses.

Figure 1:
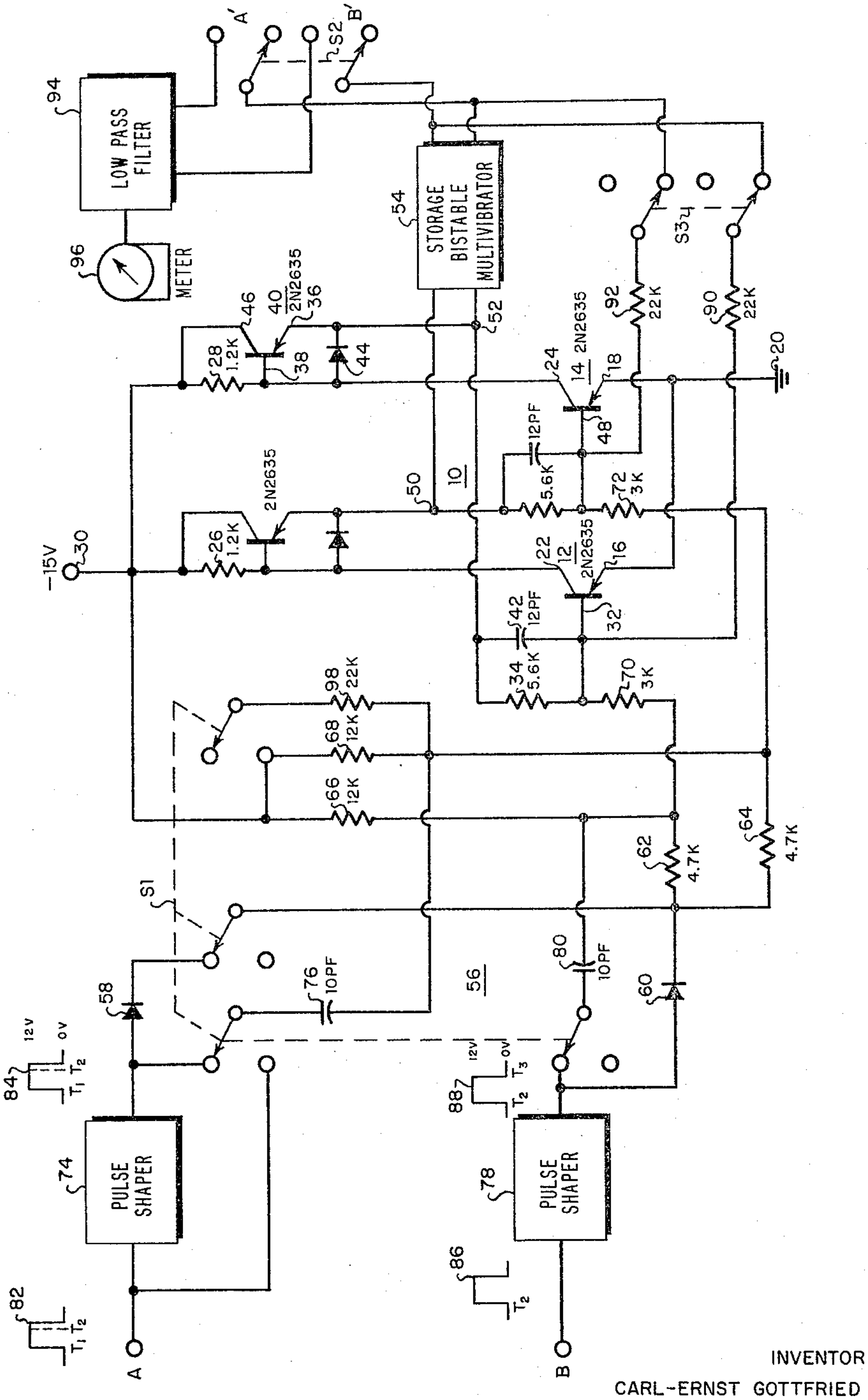
Figure 2:
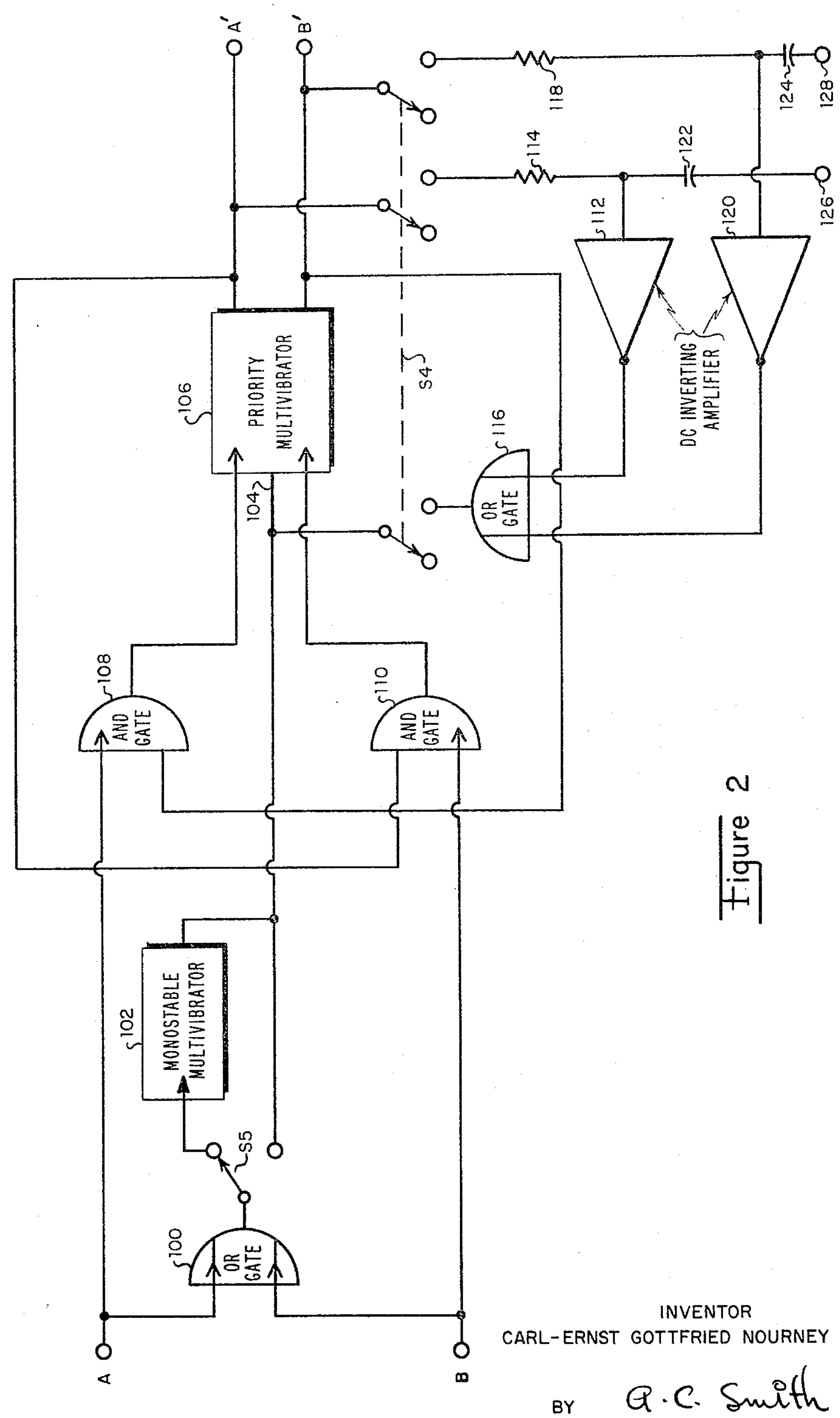

Other and incidental objects of this invention will be apparent from a reading of this specification and an inspection of the accompanying drawing in which:

FIGURE 1 illustrates schematically a preferred embodiment of this invention; and FIGURE 2 illustrates in block form another embodiment of this invention.

Referring to FIGURE 1, there is shown a signal discriminator according to this invention which, as indicated by the alternative positions of switch $S_1$, may be used as either a priority detector or a coincidence detector. With switch $S_1$ in the position shown the signal discriminator functions as a priority detector including a priority multivibrator 10. Priority multivibrator 10 is constructed similarly to a conventional bistable multivibrator, commonly referred to as a flip-flop circuit, except that it is initially biased for operation in a third discrete operating state during which both transistors 12 and 14 are either conducting or nonconducting. For purposes of this specification and the claims appended thereto the three discrete operating states of priority multivibrator 10 are designated by the terms "flip-flop," "flop-flip," and one of "flop-flop" and "flip-flip." In the flip-flop operating state one gain element is on, or conducting, and the other gain element is off, or nonconducting, while in the flop-flip operating state the conditions of the gain elements are reversed. In the "flip-flop" operating state both gain elements are conducting, and in the "flop-flop" operating state both gain elements are nonconducting.

Transistors 12 and 14 of priority multivibrator 10 have their respective emitters 16 and 18 connected in common to a point of reference potential 20, and their respective collectors 22 and 24 connected through resistors 26 and 28 to negative supply terminal 30. Base 32 of transistor 12 is connected to collector 24 of transistor 14 through the series circuit comprising resistor 34 and the emitter 36 and base 38 of transistor 40. Capacitor 42 shunts resistor 34 and diode 44 shunts the emitter 36 and base 38 of transistor 40, the collector 46 of which is connected to negative supply terminal 30. Transistor 40 and diode 44 are connected as an emitter follower stage which serves as a speed-up circuit in addition to reducing the output impedance of transistor 14 and isolating the collector 24 thereof from the output circuitry. The base 48 of transistor 14 is connected to the collector 22 of transistor 12 by a feedback circuit (shown without reference numerals) which is identical to the one just described. Output terminals 50 and 52 of priority multivibrator 10 are connected to the inputs of a storage bistable multivibrator 54 the outputs of which are connected to output terminals A′ and B′, as indicaed by the position of switch $S_2$.

An OR gate 56 comprising diodes 58 and 60 is connected between input terminals A and B and priority multivibrator 10. The commonly connected cathodes of diode 58 and 60 are connected through series resistors 62 and 70 to the base 32 of transistor 12 and through series resistors 64 and 72 to the base 48 of transistor 14. Negative supply terminal 30 is connected to the base 32 of transistor 12 through series resistors 66 and 70 and to the base 48 of transistor 14 through series resistors 68 and 72, thereby biasing priority multivibrator 10 for initial operation in a flip-flip operating-state during which both transistors 12 and 14 are saturated. In this operating state, hereinafter referred to as the ready state, the regeneration of priority multivibrator 10 is suppressed. Regeneration may also be suppressed by biasing priority multivibrator 10 for initial operation in a flop-flop operating state during which both transistors 12 and 14 are nonconducting. The anode of diode 58 is connected to input terminal A by a pulse shaper 74 and to the common terminal of resistors 64, 68, and 72 by capacitor 76. Similarly, the anode of diode 60 is connected to input terminal B by a pulse shaper 78 and to the common terminal of resistors 62, 66 and 70 by capacitor 80. Pulse shapers 74 and 78 each comprise a monostable multivibrator which generates a rectangular pulse having an amplitude of, for example, twelve volts in response to a pulse applied to the input terminal connected thereto.

Initially the priority multivibrator 10 is biased for operation in the ready state during which regeneration is suppressed and both transistors 12 and 14 are functioning as closed switches. A pulse 82 applied to input terminal A at time $T_1$ causes pulse shaper 74 to generate a rectangular pulse 84. Rectangular pulse 84 is applied by the OR gate 56, serially connected resistors 62 and 70, and serially connected resistors 64 and 72 to the respective bases 32 and 48 of transistors 12 and 14, thereby restoring the regeneration of priority multivibrator 10 and biasing it for operation in what is hereafter referred to as the active condition. Simultaneously, the leading edge of rectangular pulse 84 is differentiated by the combination of capacitor 76 and resistors 68 and 72 and the resultant spike also applied to the base 48 of transistor 14. Once in the active condition with regeneration restored multivibrator 10 operates like a conventional bistable multivibrator which would switch to either one of its flip-flop and flop-flip operating states, depending on slight deviations from balance and noise from components, if no spikes were added to the bias signal. Thus, the spike resulting from differentiation of the leading edge of rectangular pulse 84 is of sufficient magnitude to cause multivibrator 10 to switch to the flip-flop operating state in which transistor 12 is conducting and transistor 14 is nonconducting.

A second pulse 86 is applied to input terminal B at time $T_2$, which occurs before the end of the first pulse 82, causes pulse shaper 78 to generate a rectangular pulse 88. Rectangular pulse 88 is applied by the OR gate 56, serially connected resistors 62 and 70, and serially connected resistors 64 and 72 to the respective bases 32 and 48 of transistors 12 and 14, thereby maintaining priority multivibrator 10 in the active condition. The leading edge of rectangular pulse 88 is differentiated by the combination of capacitor 80 and resistors 66 and 70 and the resultant spike applied to the base 32 of transistor 12. However, this spike is of insufficient magnitude to affect the priority multivibrator 10 because it is overridden by the internal regeneration of the priority multivibrator 10 which is switched to the flip-flop operating state in response to the combinaiton of the first rectangular pulse 84 and the spike produced by differentiation of the leading edge thereof. Thus, pulse 86 applied to input terminal B and all subsequent pulses applied to either input terminal A or B before priority multivibrator 10 is returned to the ready state are prevented from triggering priority multivibrator 10 to the flop-flip operating condition. At the termination of rectangular pulse 88, which occurs at time $T_3$, multivibrator 10 is returned to the ready state in preparation for another priority decision and transistor 14 is again rendered conducting. Storage bistable multivibrator 54 is responsive to the flip-flop operating state of priority multivibrator 10 in the active condition to apply a signal to output terminal A′, thereby indicating the priority of pulse 82 which was applied to input terminal A. Since storage bistable multivibrator 54 is unaffected by termination of the active condition of priority multivibrator 10, this priority decision is stored until a different priority decision is made by priority multivibrator 10.

A priority indication is obtained at output terminal A′ or B′ whenever a pair of pulses is applied to input terminals A and B within a time interval determined by the OR combination of the rectangular pulses generated by pulse shapers 74 and 78. The duration of these rectangular pulses is selected according to the maximum repetition rate of the pulses applied to input terminals A and B and the settling time of priority multivibrator 10. To obtain a maximum of one output pulse for each input pulse where, for example, one pulse is applied to input terminal A at the half interval between two pulses applied to input terminal B, the duration of the rectangular pulses produced by pulse shapers 74 and 78 must be short enough so that alternate rectangular pulses do not overlap and so that multivibrator 10 is allowed adequate settling time between rectangular pulses. If these conditions are met, except that alternate rectangular pulses do overlap, there will be a minimum of one priority indication for each pair of input pulses.

A priority detector according to this invention, when constructed with circuit elements having the values indicated in FIGURE 1 and with low capacitance diodes having recovery times comparable to the switching times of the transistors, may be operated with a single pair of pulses or repetitively up to a four megacycle pulse repetition rate. Such a priority detector is easily calibrated and very stable because of the completely balanced design. In addition its resolution is independent of operating parameters and is infinite in the sense that it provides a priority indication for any configuration of pulses applied during a selected time interval to input terminals A and B. However, the accuracy of this priority detector is limited by a region of ambiguity defined by a separation of less than five-tenths of a nanosecond ($5\times10^{-10}$ sec.) between two pulses applied to input terminals A and B. This region of ambiguity can be further minimized by using faster diodes and transistors.

The priority indication obtained when the priority detector is operated in the region of ambiguity is ordinarily a random function of the configuration of the pulses applied to input terminals A and B. However, storage bistable multivibrator 54 may be adapted to provide priority multivibrator 10 with a hysteresis characteristic so that each priority decision is a function of the preceding priority decision during operation of the priority detector in the region of ambiguity. One way of doing this is to close swith $S_3$ and connect the base 32 of transistor 12 and the base 48 of transistor 14 to the outputs of storage bistable multivibrator 54 through resistors 90 and 92 respectively. The hysteresis characteristic is achieved because the output signal generated by storage bistable multivibrator 54 in response to each priority decision asymmetrically biases the priority multivibrator 10 so that if the next pair of pulses applied to input termials A and B are separated by less than five-tenths of a nanosecond, the priority detector will tend to give the same priority indication as the one last given. The width of the hysteresis characteristics may be controlled by altering the degree of asymmetrical biasing the output of storage bistable multivibrator 54 provides to priority multivibrator 10.

The priority detector may be used to obtain an analog output signal by connecting a low pass filter 94 and a meter 96 to the outputs of storage bistable multivibrator 54, as indicated by the alternative position of switch $S_2$. If two pulses applied to input terminals A and B are separated by more than the time interval defining the region of ambiguity, for example five-tenths of a nanosecond as described above, and if the priority detector is operated in a repetitive mode, the meter reading will be either plus (+) or minus (−) full scale depending on which input terminal A or B receives the first pulse. However, when the priority detector is operated in the region of ambiguity, the average reading of meter 96 will continuously correspond to the time interval between the A and B input pulses.

The signal discriminator of FIGURE 1 is readily converted to a coincidence detector having an inherently digital output, as indicated by the alternative position of switch $S_1$. When switch $S_1$ is in this alternative position, pulse shaper 74, diode 58, and capacitor 80 are rendered inoperative. A resistor 98 is connected in shunt with resistor 68 to bias the base 48 of transistor 14 differently from the base 32 of transistor 12 so that a pulse applied to input terminal B will always render transistor 12 nonconducting, thereby producing an indicating signal at output terminal 50. If a pulse is applied to input terminal A within a selected time interval after the pulse applied to input terminal B, it will override the bias applied to base 48, thereby rendering transistor 14 nonconducting and producing an indicating signal at output terminal 52. Pulses occurring within the selected time interval are defined as being coincident. The selected time interval may be controlled by varying the degree of asymmetry of the bias applied to transistors 12 and 14. Thus, the resolution of the coincidence detector can be controlled without changing the input waveforms.

Referring now to FIGURE 2, there is shown in block form another priority detector according to this invention. With switch $S_4$ and switch $S_5$ in the position shown both input terminals A and B are A.-C. coupled (A.-C. coupling is indicated by arrowheads within the respective blocks) to the inputs of OR gate 100. The output of OR gate 100 is A.-C. coupled to the input of monostable multivibrator 102, the output of which is connected to what is hereafter termed the activating input 104 of priority multivibraor 106. Activating input 104 corresponds to the common terminal of diodes 58 and 60 of the OR gate 56 shown in FIGURE 1. Input terminals A and B are also A.-C. coupled to respective inputs of AND gates 108 and 110 the outputs of which are A.-C. coupled to the other two inputs of priority multivibrator 106. The outputs of priority multivibrator 106 are connected to output terminals A′ and B′. AND gate 110 is connected to output terminal A′ so that it will be disabled by an output signal applied thereto. Similarly, AND gate 108 is connected to output terminal B′ so that it will be disabled by an output signal applied thereto.

Initially priority multivibrator 106 is biased for operation in the ready state. An input pulse occurring at either input terminal A or B is applied to monostable multivibrator 102 by OR gate 100 causing monostable multivibrator 102 to generate a control pulse. This control pulse is applied to the activating input 104, thereby biasing priority multivibrator 106 for operation in the active condition. Simultaneously, the input pulse is applied to priority multivibrator 106 by the appropriate AND gate 108 or 110 causing priority multivibrator 106 to switch to one of the two flip-flop and flop-flip operating states in the active condition and to generate an output signal at the appropriate output terminal A′ or B′. This output signal disables the other AND gate so that another input pulse occurring at the input terminal associated therewith during the delay time of monostable multivibrator 102 will not affect the selected state of priority multivibrator 106. The duration of the active condition and, therefore, the time interval during which a priority decision is made may be varied by altering the delay time of monostable multivibrator 102.

Another way of selecting the duration of the active condition is indicated when switch $S_4$ and switch $S_5$ are switched to the alternate position. Monostable multivibrator 102 is then rendered inoperative and the output of OR gate 100 is connected directly to the activating input 104 of priority multivibrator 106. Output terminal A′ is connected to the input of a D.-C. inverting amplifier 112 by resistor 114 which isolates the input of amplifier 112 from the output of priority multivibrator 106. The output of inverting amplifier 112 is connected to one input of OR gate 116 the output of which is connected to the activating input 104 of priority detector 106. Similarly, output terminal B′ is connected by resistor 118 to the input of a D.-C. inverting amplifier 120 the output of which is connected to the other input of OR gate 116. Capacitors 122 and 124 couple the respective inputs of inverting amplifiers 112 and 120 to reset inputs 126 and 128.

Priority multivibrator 106 now remains in the active condition even after the termination of a signal from OR gate 100 because of the feedback from the outputs of inverting amplifiers 112 and 120 to the activating input 104. Each side of the priority multivibrator 106 cooperates with the corresponding inverting amplifier 112 or 120 to function like a conventional bistable multivibrator. Thus, the priority multivibrataor 106 has at least three stable operating states: flip-flop, flop-flip, and one of flip-flip and flop-flop. The other of the flip-flip and flop-flop stable operating states is normally excluded by the internal feedback within the priority multivibrator 106. However, priority multivibrator 106 may be forced into the other stable operating state by applying a large pulse of the appropriate polarity to the activating input 104. A reset pulse may be applied to both reset inputs 126 and 128 simultaneously to return priority multivibrator 106 to the ready state in preparation for another priority decision. Alternatively a reset pulse may be applied to only one of the reset inputs 126 and 128, thereby making the return of priority multivibrator 106 to the ready state a function of the preceeding priority decision.

I claim:

1. In a discriminator providing an output signal indicating the time relationship of the input signals applied during a selected time interval to at least two input terminals, a regenerative device having three discrete operating states, means coupled to said regenerative device to suppress the regeneration thereof during operation in an initial one of said discrete operating states, and means connected between said input terminals and said regenerative device to restore the regeneration thereof in response to one of said input signals, said last-mentioned means setting said regenerative device for operation in one of the remaining two of said discrete operating states depending on the time relationship between said input signals and thereby causing said regenerative device to generate said output signal.

2. In a discriminator providing an output signal indicating the time relationship of the input signals applied during a selected time interval to at least two input terminals, a regenerative device having three discrete operating states, means coupled to said regenerative device to suppress the regeneration thereof during operation in an initial one of said discrete operating states, and means connected between said input terminals and said regenerative device to restore the regeneration thereof in response to one of said input signals, said last-mentioned means setting said regenerative device for operation in one of the remaining two of said discrete operating states depending on the time relationship between said input signals and thereby causing said regenerative device to generate said output signal, and means coupled to the output of said regenerative device for storing said output signal.

3. In a discriminator for generating an output pulse indicating the first in time of the input signals applied during a selected time interval to at least two input terminals, a regenerative device having three discrete operating states, a source of bias potential, means connecting said source of bias potential and said regenerative device to suppress the regeneration thereof during operation in an initial one of said discrete operating states, gating means connecting said input terminals and said regenerative device to restore the regeneration thereof in response to the first one in time of said input signals, circuit means connecting said input terminals and said regenerative device to set said regenerative device for operation in another of said discrete operating states indicating the input terminal to which said first one in time of said input signals is applied, said source of bias potential and said means connecting said regenerative device thereto being operative to return said regenerative device to said initial one of said discrete operating states at the end of said selected time interval.

4. Apparatus for providing a digital indication of the priority of a pair of input pulses applied during a selected time interval to a pair of input terminals, said apparatus comprising:

a regenerative device having three discrete operating states;

a source of bias potential;

means connecting said source of bias potential and said regenerative device to suppress the regeneration thereof during operation in an initial one of said discrete operating states;

gating means connecting said pair of input terminals and said regenerative device and being responsive to the first in time of said input pulses to restore the regeneration of said regenerative device and activate it for operation in either of the remaining two of said discrete operating states;

circuit means connecting said regenerative device and said pair of input terminals and being responsive to said input pulses applied thereto for rendering said regenerating device operative in the one of said remaining two discrete operating states indicating to which input terminal said first in time of said input pulses is applied;

said source of bias potential and said means connecting said regenerative device thereto being operative to return said regenerative device to the initial one of said discrete operating states at the end of said selected time interval; and storage means connected to said regenerative device and being responsive to changes in the operating state thereof for storing said digital indication.

5. Apparatus as in claim 4 wherein feedback means also connects said storage means and said regenerative device to provide said regenerative device with hysteresis characteristic during operation in a region of ambiguity.

6. Apparatus as in claim 4 wherein a low pass filter and a meter are connected to said storage means to provide an analog indication of the priority of said pair of input signals.

7. Apparatus for providing a digital output signal indicating the priority of a pair of pulses occurring during a selected time interval on a pair of leads, said apparatus comprising:

a regenerative device having a plurality of inputs and and a pair of outputs and having three discrete operating states with the regeneration of said regenerative device being suppressed during operation thereof in an initial one of said discrete operating states;

means including an OR gate, connecting each of said leads to one input of said regenerative device and being responsive to the first in time of said pulses to restore the regeneration of said regenerative device and activate it for operation in either of the remaining two of said discrete operating states;

means, including a pair of AND gates, connecting each of said leads to a different one of two other inputs of said regenerative device and being responsive to one of the pulses occurring on said leads to trigger said regenerative device for operation in another of said discrete operating states, said regenerative device producing a digital output signal in said other discrete operating state indicating on which of said leads the first in time of said pulses occurred; and means connecting said AND gates to said outputs for rendering said AND gates responsive to said digital output signal generated by the regenerative device in said other discrete operating state to prevent further triggering of said regenerative device during said selected time interval.

8. Apparatus for providing a digital indication of the occurrence within a selected time interval of a pair of pulses applied to different input terminals, said apparatus comprising:

a regenerative device having three discrete operating states;

a source of bias potential connected to said regenerative device for suppressing the regeneration thereof during operation in a first one of said discrete operating states;

circuit means connecting one of said input terminals and said regenerative device to restore the regeneration thereof in response to application of one of said pair of pulses to said one input terminal; and additional circuit means connecting the other of said input terminals and said regenerative device to render said regenerative device operative in a second one of said discrete operating states in response to the occurrence within said selected time interval of the other pulse of said pair;

said regenerative device being responsive to the occurrence of said one pulse, when said other pulse occurs after said selected time interval, for operating in a third one of said discrete operating states.

9. An improved tristable switching circuit comprising:

regenerative device having an input and an output;

means including inverting feedback amplifier circuit which connects the output of said regenerative device to the input thereof to provide said regenerative device with a flip-flop stable operating state, a flop-flip stable operating state, and at least one of flip-flip and flop-flop stable operating states, said regenerative device initially operating in said one of the flip-flip and flop-flop stable operating states;

input terminals for receiving input signals;

means connecting the input of said regenerative device to said input terminals for setting said regenerative device to either of said flip-flop and flop-flip stable operating states in response to an input signal; and a source of control signal connected to said inverting feedback amplifier circuit for resetting said regenerative device to said one of the flip-flip and flop-flop stable operating states.

10. An improved switching circuit responsive to input signals applied to a pair of input terminals, said circuit comprising:

a regenerative device having a plurality of inputs and outputs and having a flip-flop operating state, a flop-flip operating state and at least one of flip-flip and flop-flop operating states with the regeneration of said regenerative device being suppressed during operation in said one of said flip-flip and flop-flop operating states;

means connected between said input terminals and one input of said regenerative device for restoring the regeneration thereof in response to said input signals to set said regenerative device for operation in one of said flip-flop and flop-flip operating states;

means connected between said input terminals and two others of said inputs for triggering said regenerative device to operate in one of said flip-flop and flop-flip operating states in response to selected ones of said input signals;

at least one inverting feedback amplifier connected between an output of said regenerative device and said one input thereof to maintain said one of said flip-flop and flop-flip operating states; and a source of control signal connected to said inverting feedback amplifier for resetting said regenerative device to said one of the flip-flip and flop-flop operating states.

11. A switching circuit comprising:

a regenerative device having at least a flip-flop operating state, a flop-flip operating state, and one of flip-flip and flop-flop operating states;

biasing means connected to said regenerative device for suppressing the regeneration thereof to set said regenerative device to said one of said flip-flip and flop-flop operating states;

at least a pair of inputs for receiving input signals to be applied to the switching circuit; and means connecting said inputs to said regenerative device for restoring the regeneration of said regenerative device for a selected time interval and for setting said regenerative device during said selected time interval to one of said flip-flop and flop-flip operating states, said regenerative device returning to said one of said flip-flip and flop-flop operating states at the end of said selected time interval.

12. A switching circuit for indicating an input signal condition, said circuit comprising:

a regenerative device including a pair of cross-coupled gain elements and having first, second, and third discrete operating states, each of said second and third discrete operating states being indicative of a selected input signal condition;

biasing means connected to said regenerative device for suppressing the regeneration thereof to set said regenerative device to said first discrete operating state;

at least a pair of inputs for receiving input signals to be applied to the switching circuit; and means connecting said inputs to said regenerative device for restoring the regeneration of said regenerative device for a selected time interval and for setting said regenerative device during said selected time interval to the one of said second and third discrete operating states which is indicative of the signal condition at said inputs, said regenerative device returning to said first discrete operating state at the end of said selected time interval.

References Cited by the Examiner

UNITED STATES PATENTS

| | | | |
|---|---|---|---|
| 2,901,608 | 8/1959 | Paulsen et al. | 328—205 |
| 2,902,600 | 9/1959 | Coffin | 328—205 |
| 2,932,796 | 4/1960 | Von Kummer et al. | 328—205 |

ARTHUR GAUSS, *Primary Examiner.*

J. ZAZWORSKY, *Assistant Examiner.*